(12) United States Patent
Poole et al.

(10) Patent No.: US 10,341,110 B2
(45) Date of Patent: Jul. 2, 2019

(54) SECURING USER CREDENTIALS

(71) Applicant: HEWLETT-PACKARD DEVELOPMENT COMPANY, L.P., Houston, TX (US)

(72) Inventors: Gary Lewis Poole, Fort Collins, CO (US); John Luke Herndon, Fort Collins, CO (US); Donald Gonzalez, Redwood City, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 45 days.

(21) Appl. No.: 14/771,901

(22) PCT Filed: Mar. 29, 2013

(86) PCT No.: PCT/US2013/034703
§ 371 (c)(1),
(2) Date: Sep. 1, 2015

(87) PCT Pub. No.: WO2014/158197
PCT Pub. Date: Oct. 2, 2014

(65) Prior Publication Data
US 2016/0020905 A1    Jan. 21, 2016

(51) Int. Cl.
*H04L 9/32* (2006.01)
*G06F 21/62* (2013.01)
(52) U.S. Cl.
CPC ........ *H04L 9/3226* (2013.01); *G06F 21/6227* (2013.01); *H04L 9/3234* (2013.01)

(58) Field of Classification Search
CPC .. G06F 21/6227; H04L 9/3234; H04L 9/3226
See application file for complete search history.

(56) References Cited

U.S. PATENT DOCUMENTS

| | | | |
|---|---|---|---|
| 6,085,323 | A | 7/2000 | Shimizu et al. |
| 6,230,272 | B1 | 5/2001 | Lockhart et al. |
| 7,685,430 | B1 | 3/2010 | Masurkar |
| 7,751,565 | B2 | 7/2010 | Yuen |

(Continued)

FOREIGN PATENT DOCUMENTS

| KR | 1020010008298 | 2/2001 |
|---|---|---|
| KR | 1020020058394 | 7/2002 |

(Continued)

OTHER PUBLICATIONS

"O'Reilly—Kerberos The Definitive Guide—OuiFi.fr," Retrieved from Internet Feb. 10, 2014, http://www.ouitech.fr/ebook/kerberos/0596004036_kerberos-chp-3-sect-3.html >.

(Continued)

*Primary Examiner* — Brandon S Hoffman
*Assistant Examiner* — Nega Woldemariam
(74) *Attorney, Agent, or Firm* — HPI Patent Department (57) ABSTRACT

A password is secured using a first key. At least one of a password record, a username record, and as domain name record is created. The at least one password record, username record, and domain name record are associated. The associated records are encrypted using a second key, where the second key is different from the first key. A credentials record is created based on the encrypted associated records.

20 Claims, 4 Drawing Sheets

(56) References Cited

U.S. PATENT DOCUMENTS

| | | | |
|---|---|---|---|
| 8,205,098 B2 | 6/2012 | Malpani | |
| 2003/0131266 A1* | 7/2003 | Best | G06F 21/46 713/184 |
| 2008/0031447 A1 | 2/2008 | Geshwind | |
| 2009/0296930 A1* | 12/2009 | Krantz | H04L 9/32 380/247 |
| 2009/0327740 A1* | 12/2009 | Schneider | G06F 21/46 713/183 |
| 2012/0254602 A1* | 10/2012 | Bhansali | G06F 21/575 713/2 |
| 2014/0068270 A1* | 3/2014 | Shenoy | G06F 21/34 713/182 |

FOREIGN PATENT DOCUMENTS

| | | |
|---|---|---|
| KR | 1020090048213 | 5/2009 |
| KR | 1020100004782 | 1/2010 |

OTHER PUBLICATIONS

International Searching Authority, ISA/KR. International Search Report. dated Jan. 22, 2014. Application No. PCT/US2013/034703. Filing date Mar. 29, 2013.

* cited by examiner

SECURING USER CREDENTIALS

BACKGROUND

Users are often required to provide login information to gain access to or to unlock an operation system, and to connect to a network or a remote server. Thus, users may have multiple login information for various authentication purposes. Users may memorize their multiple login information or store their login information on a storage device for later use.

BRIEF DESCRIPTION OF THE DRAWINGS

The following detailed description references the drawings, wherein.

DETAILED DESCRIPTION

Various aspects of the present disclosure are directed to securing user credentials. More precisely, various aspects of the present disclosure are directed to packaging and encrypting a user's credentials that include a domain name, username, and password, in a secure planner on a storage media. For example, the disclosed solution includes encrypting the password separately in addition to encrypting the domain name and username such that the username and domain name can be decrypted without exposing the password in clear text. In addition, the disclosed solution includes reducing the amount of time that the user's credentials remains unprotected in memory by erasing the decrypted password after submission for authentication.

A user's credentials (e.g., domain name, username, and password) are used to provide authentication. For example, credentials may be required when logging into an operating system, unlocking an operating system, connecting to a network share, or connecting to a remote system. Thus, a user may have different credentials for authentication and/or access. For example, a user may have different credentials for accessing home computers and work computers. Further, a user may have different credentials in an environment, where each of the credentials has different permissions. For example, if a user may use one set of credentials to log onto his system and another set of credentials to access a shared drive across the network. Accordingly, the user may need to store the credentials in a secure manner to prevent unauthorized use, and to determine which credentials to use for any particular system access.

The vulnerability of a user's credentials and unauthorized access to the system is due to the use of weak or common passwords, and storing passwords insecurely (e.g., on a post-it note), and/or keyboard loggers that can record the authentication as the user types it. Thus, the traditional method of typing passwords is prone to over-the-shoulder attacks. Other solutions employ smartcards and fingerprint scanners which use cryptographic certificates for authentication that identify a user instead of encrypting the user credentials (e.g., username and password). Such solutions may be expensive and may restrict the user to only one user identity at a time. Multiple smartcards for the same system may not be used if the user has different credentials to connect to other resources (e.g., network shares and/or remote computers) while already logged into the system via smartcard. When using certificates, a unique certificate is used for each user on a system. In a single user scenario, a default certificate may not be used. Moreover attacker that intercepts a certificate can have access to all systems that use the default certificate for authentication. Where a user accesses multiple systems, it may become difficult to manage certificates that identify the same user on multiple systems without a central server. Due to the above stated challenges, the certificate solution may be expensive.

Accordingly, examples disclosed herein address the challenges described above by providing a low cost solution for securely packaging and encrypting a user's credentials in on a storage media (e.g., USB stick, NFC tag, etc). The solution includes two levels of encryption where the password is encrypted separately (e.g., with a different encryption key) from the domain name and username such that the username and the domain name may be decrypted (and shown in dear text) without exposing the password. Thus, by reducing the amount of time that the user's credentials is unprotected in memory (e.g., decrypted), the risk that an attacker may retrieve credentials from memory is reduced. By keeping the credentials encrypted before it is transmitted/stored to an external media and decrypting credentials after transmission from the external media, vulnerability of attacks is reduced. Besides providing a secure mechanism for authentication, the disclosed solution also provide means for the user to determine which credentials from a plurality of credentials the user wishes to use for authentication. For example, by encrypting the password separately from the domain name and username, the domain name and username may he parsed separately and displayed to the user for verification/confirmation. Thus, if there is a custom encryption key used to encrypt the password, the user then knows which key to supply since the correct credential has been confirmed.

In one example, a computing device for securing a user's credentials includes a processor to encrypt a password using a first key. The processor is to create at least one of a password record, a username record, and a domain name record, and to associate the records. The processor is further to encrypt the associated records using a second key, where the second key is different from the first key. The processor is to create a credential record based on the encrypted associated records.

In another example, a method of securing a user's credentials that includes at least one of a password, a username, and a domain name is provided. The method includes encrypting the password using a first key and creating at least one of a password record for the encrypted password, a username record for the username, and a domain name record for the domain name. The method includes associating the at least one password record, username record, and domain name record, and encrypting the associated records using a second key, where the second key is different from the first key. The method also includes creating a credentials record for the encrypted associated records, and storing the credentials record on a storage medium. The password record, the username record, the domain name record, and the credentials record include an identifier, a payload, and a payload size.

In another example, a non-transitory computer-readable medium includes instructions that, when executed by a processor of a computing device, cause the processor to encrypt a user password using a first key and create a plurality of records including at least one of a password record, a username record, and a domain name record corresponding to the user's encrypted password, the user's username, and the user's domain name, respectively. The instructions are executable to associate the plurality of records and encrypt the associated plurality of records using a second key, where the second key is different from the first key. The instructions are further executable to create a credential record based on the encrypted associated records, where the plurality of records and the credential record include an identifier, a payload, and a payload size. The instructions are executable to store the credentials record on a storage medium including at least one of a memory device or a near field communication (NFC) tag.

As used herein, the term "credentials" is defined as including, but not necessarily limited to, a domain, username, and/or password used to identify a user to log into a computer, an operating system, a network, a server, a system, and the like.

As used herein, the term "record" is defined as including, but not necessarily limited to, a dataset that contains an identifier, a payload, and a payload size. An identifier may be used to identify the purpose of a message. A payload refers to the actual data to be delivered and may or may not be encrypted. A payload size describes the size of the payload (e.g., in bytes), and may he used to simplify decryption.

As used herein, the term "salting" is defined as including, but not necessarily limited to, adding a set number of random characters to text before encrypting. This ensures that encrypting the same text with different random characters will not produce identical results. As used herein, the term "unsalting" is defined as including, but not necessarily limited to, removing the set of random characters after decrypting.

As used herein, the term "associate" is defined as including, but not necessarily limited to, appending, concatenating, or combining records together (e.g., password record, username record, and domain name record).

Figure 1:
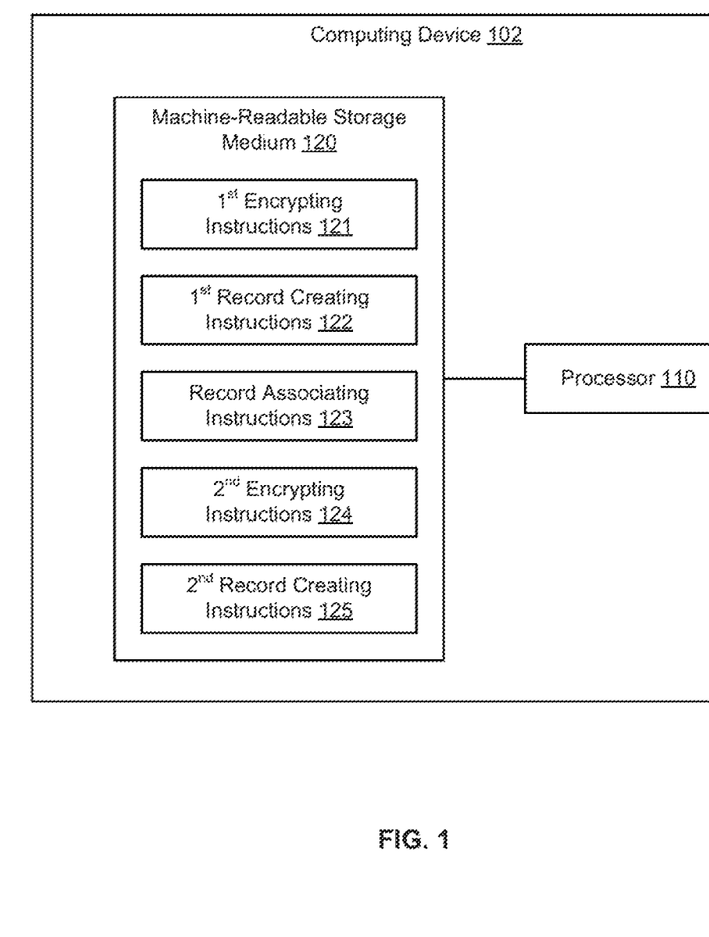
FIG. 1 is a block diagram of a computing device for securing a user's credentials, according to one example.

FIG. 1 depicts a block diagram of a computing device for securing a user's credentials, according to one example. Computing device 102 may be, for example, a tablet, a smartphone, a cellular device, a personal digital assistant (PDA), an all-in-one (AIO) computing device, a notebook, a convertible or hybrid notebook, a netbook, a laptop, a desktop, or any other computing device. In the example of FIG. 1, computing device 102 includes a processor 110 and a machine-readable storage medium 120.

Processor 110 may be one or more central processing units (CPUs), microprocessors, and/or other hardware devices suitable for retrieval and execution of instructions stored in machine-readable storage medium 120. Processor 110 may fetch, decode, and execute instructions 121-125 to enable securing a user's credentials, as described below. As an alternative, or in addition to retrieving and executing instructions, processor 110 may include one or more electronic circuits comprising a number of electronic components for performing the functionality of one or more instructions 121-125.

Machine-readable storage medium 120 may be an electronic, magnetic, optical, or other physical storage device that stores executable instructions. Thus, machine-readable storage medium 120 may be, for example, Random Access Memory (RAM), an Electrically-Erasable Programmable Read-Only Memory (EEPROM), a storage drive, an optical disc, and the like. As described in detail below, machine-readable storage medium 120 may be encoded with executable instructions for enabling securing user credentials.

First encrypting instructions 121 may encrypt a password using a first key. For example, the user's password, including any null terminating character may be encrypted using a first encryption key. In certain examples, the password may be salted prior to encryption with the first encryption key.

First record creating instructions 122 may create at least one of a password record, a username record, and a domain name record. For example, a record may he created for the encrypted password with the identifier "password." In this example, the payload is set to be the encrypted password, and the size of the payload is set to be the size of the encrypted password. However, if there is no password in the user's credentials, the payload size is set to zero. To illustrate, if a user creates a password with the characters "mypassword," and the password is encrypted as "~!@#$%^&*( )_+," then the password record may have the following attributes: id="password," size of payload=13, and payload="~!@#$%^&*( )_+."

A record may also be created for the user's username with the identifier "username," for example. In this example, the payload is the clear text username, including any null terminating character, and the size of the payload is set to be the size of the clear text username plus one. To illustrate, if the username is "myusername," then the username record may have the following attributes: id="username," size of payload=11, and payload "myusemame."

A record may also be created for the user's domain name with the identifier "domain," for example. In this example, the payload is the clear text domain name, including any null terminating character, and the size of the payload is set to be the size of the clear text domain name plus one. However, if there is no domain name in the user's credentials, the payload size is set to zero. To illustrate, if the domain name is "mydomain," then the domain name record may have the following attributes: id="domain," size of payload=9, and payload="my domain."

Record associating instructions 123 may associate one or more of the password record, username record, and domain name record. For example, the password record, the username record, and the domain name record may be concatenated or appended together.

Second encrypting instructions 124 may encrypt the associated records using a second key different from the first key. For example, the concatenated/appended password, username, and domain name records may be encrypted using a second encryption key that is different from the first encryption key used to encrypt the user's password. Thus, as second level of encryption is employed to further secure the user's credentials. Further, the user's password is encrypted separately from the username and domain name.

Second record creating instructions 125 may create a credentials record based on the encrypted associated records. For example, a record may be created for the encrypted concatenated records (i.e., password record, username record, domain name record). For example, the credentials record may have the following attributes: id="credentials," size of payload=size of encrypted appended records (i.e., 13+11+9=33), and payload=encrypted appended records encrypted(encrypted password record+username record+domain name record)). Accordingly, the credentials record may be transmitted or stored on a storage media such as a memory device or a near field communication (NFC) tag, for example.

Figure 2:
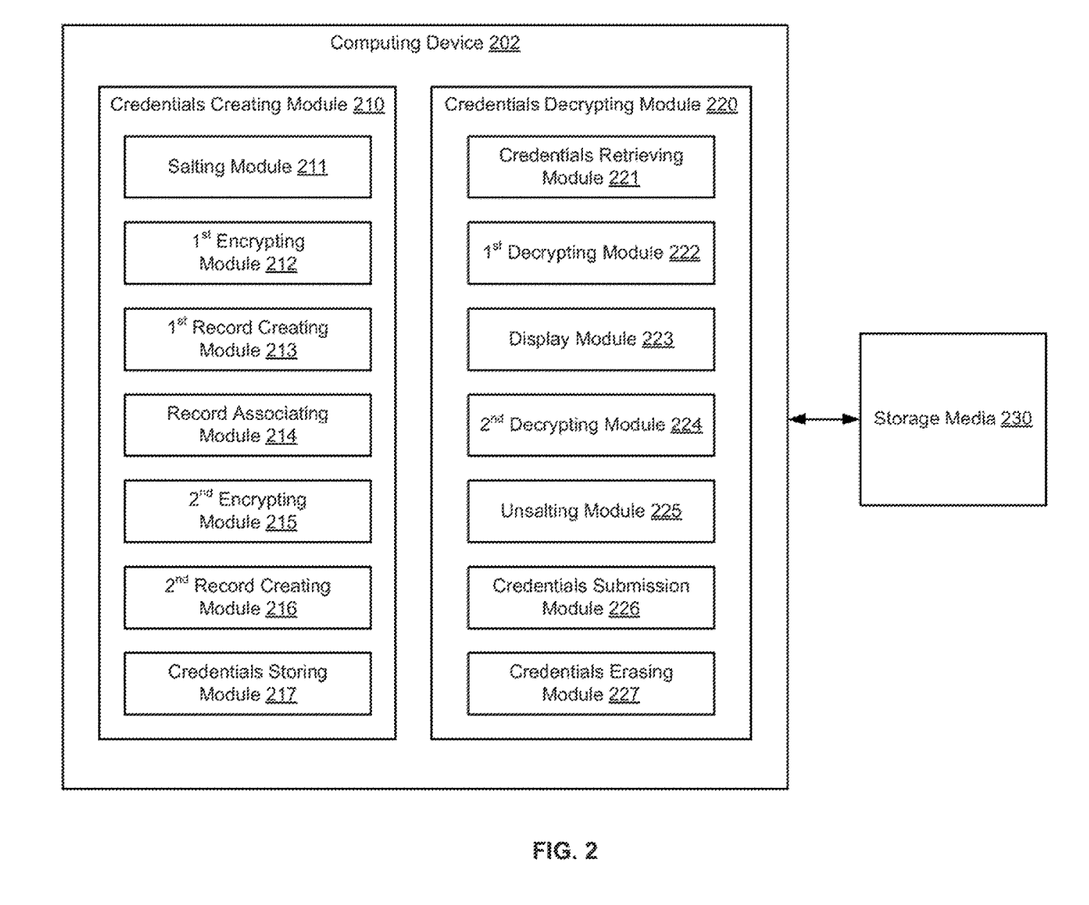
FIG. 2 is a block diagram of a computing device for securing, a user's credentials, according to one example.

FIG. 2 is a block diagram of a computing device for securing a user's credentials, according to one example. As illustrated in FIG. 2 and described below, computing device 202 may communicate with storage media 230 to securely store and/or retrieve user credentials, for example.

As illustrated, computing device 202 may include a credentials creating module 210 and a credentials decrypting module 220. Credentials creating module 210 may include a number of modules 211-217 and credentials decrypting module 220 may include a number of modules 221-227. Each of the modules may include a series of instructions encoded on a machine-readable storage medium and executable by a processor of the computing device 202. In addition, or as an alternative, each module may include one or more hardware devices including electronic circuitry for implementing the functionality described below. It should be noted that one or more modules may be combined such that fewer modules than shown in FIG. 2 may be used to implement the functionality described below. Moreover, one module may perform functionalities performed by other one or more modules.

Credentials creating module 210 (including modules 211-217) may create an encrypted credentials record as described above that may be stored on storage media 230. Credentials decrypting module 220 (including modules 224-227) may retrieve and decrypt the credentials record from the storage media 230.

Salting module 211 may salt the password prior to encryption with the first key. For example, a set of random characters may be added to the password text before encryption.

First encrypting module 212 may encrypt the password using the first key. For example, the user's password and null terminating character may be encrypted using a first encryption key.

First record creating module 213 may create one or more password record, username record, and domain name record. In certain examples, each of the password record, username record, and domain name record includes an identifier, a payload, and a payload size. The identifier may be used to identify the record and may be in the form of a string. The payload is the actual data to be delivered (encrypted or unencrypted). The payload size describes the size or length of the payload (e.g., in bytes).

Record associating module 214 may associate the one or more password record, username record, and domain name record. For example, the password record, username record, and domain name record may be concatenated or combined together.

Second encrypting module 215 may encrypt the associated password, username, and domain name records using a second key, where the second key is different from the first key. Accordingly, the domain name and username may be parsed separately without exposing the password in clear text.

Second record creating module 216 may create a credentials record that is based on the encrypted association. For example, the credentials record may be created based on the concatenated/appended password record, username record, and domain name record.

Credentials storing module 217 may store the credentials record on storage media 230. For example, the credentials record may be transmitted, transferred, or stored on an external storage media such as a USB stick or an NFC tag.

As described above, credentials decrypting module 220 is to receive and decrypt the credentials records from the storage media 230 in response to as request for authentication. For example, a user may wish to enter their credentials to gain access to an operating system, a computer system, a network, etc.

Credentials retrieving module 221 may retrieve the credentials record from the storage media in response to a user authentication request. For example, the credentials record may be retrieved from storage media 230 (e.g., USB stick, NFC tag, etc.).

First decrypting module 222 may decrypt the credentials record using the second key to obtain one or more of the password record, the username record, and the domain name record. For example, the credentials record is decrypted to extract its content records (e.g., password, username, and domain name records).

Display module 223 may display the username and domain name in clear text. For example, the unencrypted credentials record may be parsed for the username and domain name records. Because the payloads for the username and domain name are in clear text, the username and domain name may be displayed to the user for feedback/verification. It should be noted that the password record is still encrypted and thus is not displayed to the user in clear text.

Second decrypting, module 224 may decrypt the password using the first key. For example, the unencrypted credentials record may be parsed for the password record which is still encrypted. Subsequently, the password record is decrypted using the first encryption, when prompted for authentication, for example.

Unsalting module 225 may unsalt the decrypted password. For example, the decrypted password may be unsalted to remove any random characters that may have been added to the password prior to encrypting.

Credentials submission module 226 may submit the unencrypted domain name, username, and password to an operating system, network, or server, for example.

Credentials erasing module 227 may erase the decrypted password from a memory of the computing device to reduce exposure of the clear text password to attack.

Figure 3:
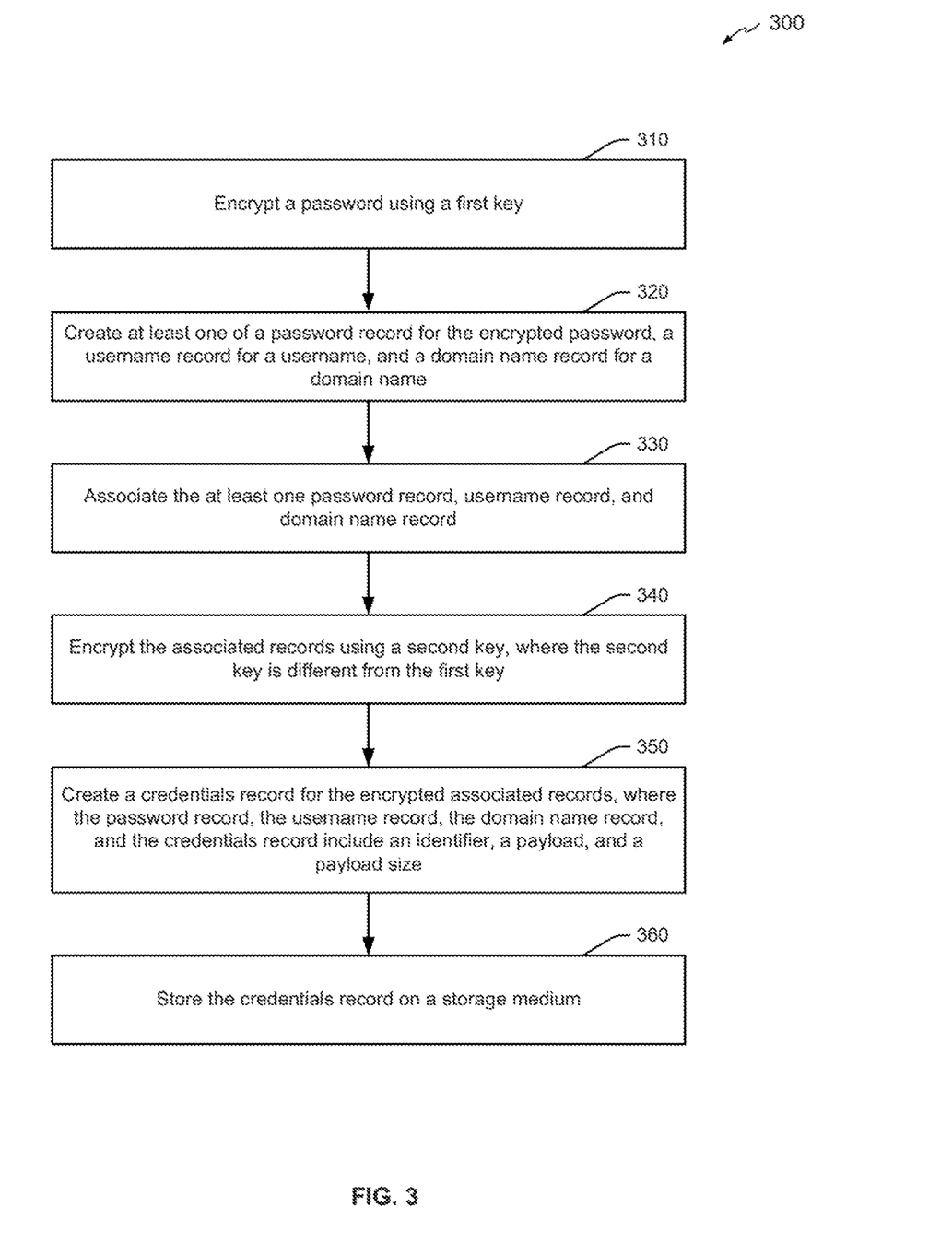
FIG. 3 is a flowchart of a method of securing a user's credentials, according to one example.

FIG. 3 is a flowchart of a method of securing a user's credentials, according to one example. Although execution of method 300 is described below with reference to the components of computing device 102 and 102 of FIGS. 1 and 2, respectively, other suitable components for execution of method 309 will be apparent to those of skill in the art. Additionally, components for executing method 300 may be spread among multiple devices. Method 300 may be implemented in the form of executable instructions stored on a machine-readable storage medium, such as non-transitory machine-readable storage medium 120 of FIG. 1, and/or in the form of electronic circuitry. In some examples, method 300 additional steps in addition to and/or in lieu of those depicted in FIG. 3.

Method 300 includes encrypting a password using a first key, at 310. The password may be salted prior to encryption. Method 300 includes creating at least one of a password record for the encrypted password, a username record for a username, and a domain name record for a domain name, at 320. Method 300 includes associating the at least one password record, username record, and domain name record, at 330. For example, the password, username, and domain name records may be concatenated. Method 300 includes encrypting the associated records using a second key, where the second key is different from the first key, at 340. Method 300 includes creating a credentials record for the encrypted associated records, at 350. The password record, the username record, the domain name record, and the credentials record include an identifier, a payload, and a payload size. Method 300 includes storing the credentials record on a storage medium, at 360. The storage medium may include USB stick or an NFC tag.

Figure 4:
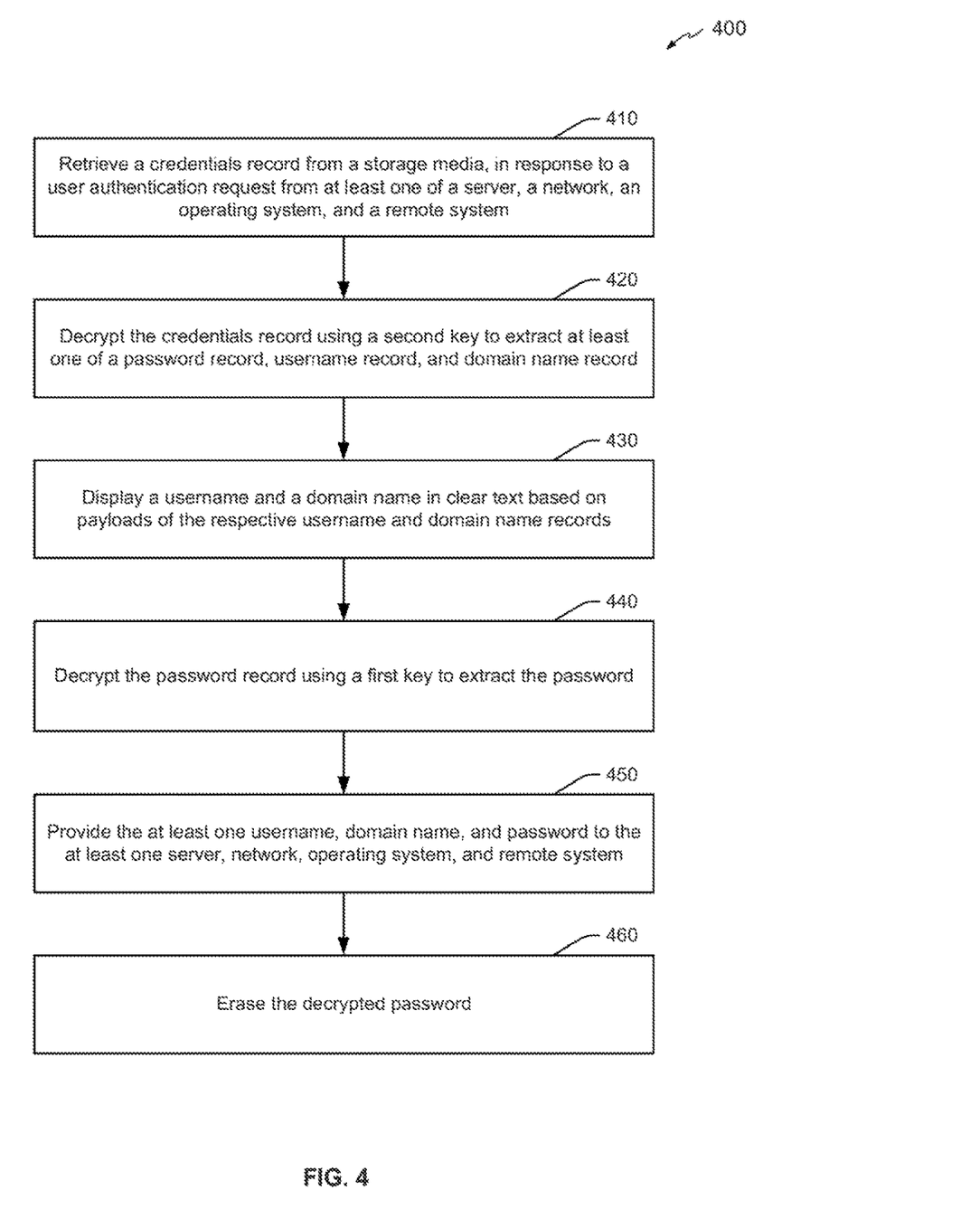
FIG. 4 is a flowchart of a method of securing a user's credentials, according to one example.

FIG. 4 is a flowchart of a method of securing a user's credentials, according to one example. Although execution of method 400 is described below with reference to the components of computing device 102 and 102 of FIGS. 1 and 2, respectively, other suitable components for execution of method 400 will be apparent to those of skill in the art. Additionally, components for executing method 400 may be spread among multiple devices. Method 400 may be implemented in the form of executable instructions stored on a machine-readable storage medium, such as non-transitory machine-readable storage medium 120 of FIG. 1, and/or in the form of electronic circuitry. In some examples, method 400 additional steps in addition to and/or in lieu of those depicted in FIG. 4.

Method 400 includes retrieving a credentials record from a storage media, in response to a user authentication request from at least one of a server, as network, an operating system, and a remote system, at 410. Method 400 includes decrypting the credentials record using as second key to extract at least one of a password record, a username record, and a domain name record, at 420. Method 400 includes displaying a username and a domain name in clear text based on payloads of the respective username and domain name records, at 430. Method 400 includes decrypting the password record using the first key to extract the password in clear text, at 440. Method 400 includes providing the at least one username, domain name, and password to the at least one server, network, operating system, and remote system, at 450. Method 400 includes erasing the decrypted password, at 460.

In the foregoing description, numerous details are set forth to provide an understanding of the present disclosure. However, it will be understood by those skilled in the art that the present disclosure may be practiced without these details. While the disclosure has been described with respect to a limited number of examples, those skilled, in the art will appreciate numerous modifications and variations therefrom. It is intended that the appended claims cover such modifications and variations as fall within the true spirit and scope of the disclosure.

What is claimed is:

1. A computing device comprising:
a processor to:
encrypt a password using a first key to produce an encrypted password;
create a password record having a payload comprising the encrypted password, create a domain name record having a payload comprising a clear text domain name, and create a username record having a payload comprising a clear text username;
encrypt a combination of the password record, the domain name record, and the username record using a second key, wherein the second key is different from the first key, and the encrypting of the combination produces an encrypted combination;
create a credentials record based on the encrypted combination of the password record, the domain name record, and the username record;
store the credentials record in a storage medium;
in response to a user authentication request:
retrieve the credentials record from the storage medium;
decrypt the credentials record using the second key to obtain the password record, the domain name record, and the username record, wherein the clear text domain name and the clear text username are obtained from the decrypting of the credentials record without exposing the password;
receive an input at the computing device responsive to a user verifying the username and the domain name; and
after receiving the input, decrypt the password of the password record extracted from the credentials record based on decrypting the credentials record, the decrypting of the password using the first key to produce a decrypted password.

2. The computing device of claim 1, the processor to salt the password prior to encrypting the password with the first key to produce the encrypted password.

3. The computing device of claim 1, wherein the password record includes an identifier, the payload comprising the encrypted password, and a payload size specifying a size of the encrypted password, and the domain name record includes an identifier, the payload comprising the clear text domain name, and a payload size of the clear text domain name.

4. The computing device of claim 3, wherein the username record having the payload comprising the clear text username includes a null terminating character, and wherein a payload size in the username record specifies a size of the clear text username plus the null terminating character.

5. The computing device of claim 3, wherein the domain name record having the payload comprising the clear text domain name includes a null terminating character, and wherein the payload size in the domain name record specifies a size of the clear text domain name plus the null terminating character.

6. The computing device of claim 1, wherein the credentials record has a payload size specifying a size of the encrypted combination of the password record, the domain name record, and the username record.

7. The computing device of claim 1, wherein the storage medium comprises at least one of a memory device or a near field communication (NFC) tag.

8. The computing device of claim 1, the processor further to:
unsalt the decrypted password;
submit the unsalted decrypted password, the username, and the domain name for authentication; and
erase the unsalted decrypted password.

9. The computing device of claim 1, the processor further to:
allow access to a system based on the credentials record in response to the user authentication request.

10. The computing device of claim 1, the processor further to:
cause display of the clear text username and the clear text domain name, the displayed clear text username from the username record extracted from the credentials record based on decrypting the credentials record, and the displayed clear text domain name from the domain name record extracted from the credentials record based on decrypting the credentials record,
and wherein the input is responsive to the displayed clear text username and the displayed clear text domain name.

11. A method of a computing device, comprising:
encrypting a password using a first key to produce an encrypted password;

creating a password record having a payload comprising the encrypted password;
creating a domain name record having a payload comprising a clear text domain name;
creating a username record having a payload comprising a clear text username;
encrypting a combination of the password record, the domain name record, and the username record using a second key, wherein the second key is different from the first key, and the encrypting of the combination produces an encrypted combination;
creating a credentials record based on the encrypted combination of the password record, the domain name record, and the username record;
storing the credentials record on a storage medium; and
in response to a user authentication request:
retrieving the credentials record from the storage medium;
decrypting the credentials record using the second key to obtain the password record, the domain name record, and the username record, wherein the clear text domain name and the clear text username are obtained from the decrypting of the credentials record without exposing the password;
receiving an input at the computing device responsive to a user verifying the username and the domain name; and
after receiving the input, decrypting the password of the password record extracted from the credentials record based on decrypting the credentials record, the decrypting of the password using the first key to produce a decrypted password.

12. The method of claim 11, further comprising salting the password prior to encrypting the password with the first key to produce the encrypted password.

13. The method of claim 11, further comprising:
in response to the user authentication request from a system:
displaying the clear text username and the clear text domain name in clear text, the displayed clear text username from the username record extracted from the credentials record based on decrypting the credentials record, and the displayed clear text domain name from the domain name record extracted from the credentials record based on decrypting the credentials record,
and wherein the input is responsive to the displayed clear text username and the clear text domain name.

14. The method of claim 11, wherein the password record includes an identifier, the payload comprising the encrypted password, and a payload size specifying a size of the encrypted password.

15. The method of claim 14, wherein the domain name record includes an identifier, the payload comprising the clear text domain name, and a payload size based on a size of the clear text domain name, and
wherein the username record includes an identifier, the payload comprising the clear text username, and a payload size based on a size of the of the clear text username.

16. The method of claim 11, further comprising:
granting, by the computing device in response to the user authentication request, access to a system based on the username, the domain name, and the password of the credentials record.

17. A non-transitory computer-readable medium comprising instructions that, when executed cause a computing device to:
encrypt a user password using a first key to produce an encrypted password;
create a password record having a payload comprising the encrypted password;
create a username record and a domain name record, the username record having a payload comprising a clear text username, and the domain name record having a payload comprising a clear text domain name;
encrypt a combination of the password record, the username record, and the domain name record using a second key, wherein the second key is different from the first key, and the encrypting of the combination produces an encrypted combination;
create a credentials record based on the encrypted combination of the password record, the username record, and the domain name record;
store the credentials record on a storage medium comprising at least one of a memory device or a near field communication (NFC) tag;
in response to a user authentication request:
retrieve the credentials record from the storage medium;
decrypt the credentials record using the second key to obtain the password record, the domain name record, and the username record, wherein the clear text domain name and the clear text username are obtained from the decrypting of the credentials record without exposing the password;
receive an input at the computing device responsive to a user verifying the username and the domain name; and
after receiving the input, decrypt the password of the password record extracted from the credentials record based on decrypting the credentials record, the decrypting of the password using the first key to produce a decrypted password.

18. The non-transitory computer-readable medium of claim 17, wherein the instructions when executed cause the computing device to:
in response to a credentials request:
display the clear text username and the clear text domain name to a user for verification, the displayed clear text username from the username record extracted from the credentials record based on decrypting the credentials record, and the displayed clear text domain name from the domain name record extracted from the credentials record based on decrypting the credentials record,
and wherein the input is responsive to the displayed clear text username and the displayed clear text domain name.

19. The non-transitory computer-readable medium of claim 17, wherein the domain name record includes an identifier, the payload comprising the clear text domain name, and a payload size based on a size of the of the clear text domain name, and
wherein the username record includes an identifier, the payload comprising the clear text username, and a payload size based on a size of the of the clear text username.

20. The non-transitory computer-readable medium of claim 17, wherein the instructions when executed cause the computing device to:

in response to the user authentication request, grant access to a system based on the username, the domain name, and the password of the credentials record.

\* \* \* \* \*

UNITED STATES PATENT AND TRADEMARK OFFICE
CERTIFICATE OF CORRECTION

PATENT NO. : 10,341,110 B2  
APPLICATION NO. : 14/771901  
DATED : July 2, 2019  
INVENTOR(S) : Gary Lewis Poole et al.

Page 1 of 1

It is certified that error appears in the above-identified patent and that said Letters Patent is hereby corrected as shown below:

On the Title Page

In item (57), Abstract, in Column 2, Line 2, delete "as" and insert -- a --, therefor.

In the Claims

In Column 9, Line 61, Claim 15, after "on a size" delete "of the".

In Column 10, Line 59, Claim 19, after "on a size" delete "of the".

In Column 10, Line 63, Claim 19, after "on a size" delete "of the".

Signed and Sealed this  
First Day of October, 2019

Andrei Iancu  
*Director of the United States Patent and Trademark Office*